US008625655B2

(12) United States Patent
Deisher et al.

(10) Patent No.: US 8,625,655 B2
(45) Date of Patent: Jan. 7, 2014

(54) ADAPTIVE RADIO FREQUENCY INTERFERENCE MITIGATION DURING CHANNEL SCANNING OR HOPPING

(75) Inventors: Michael E. Deisher, Hillsboro, OR (US); Haicheng Zhou, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1274 days.

(21) Appl. No.: 11/860,376

(22) Filed: Sep. 24, 2007

(65) Prior Publication Data

US 2009/0080498 A1    Mar. 26, 2009

(51) Int. Cl.
*H04B 1/00* (2006.01)

(52) U.S. Cl.
USPC ............ 375/136; 375/147; 375/327; 375/346

(58) Field of Classification Search
USPC .................................. 375/136, 147, 327, 346
See application file for complete search history.

(56) References Cited

U.S. PATENT DOCUMENTS

| | | | |
|---|---|---|---|
| 5,471,660 A | 11/1995 | Masaki | |
| 6,898,721 B2 | 5/2005 | Schmidt | |
| 7,242,696 B2 | 7/2007 | Grundvig et al. | |
| 2002/0141434 A1* | 10/2002 | Grundvig et al. | 370/442 |
| 2003/0198307 A1 | 10/2003 | Neill et al. | |
| 2005/0117633 A1* | 6/2005 | Schmidt | 375/219 |
| 2005/0265486 A1* | 12/2005 | Crawley | 375/326 |
| 2006/0290434 A1 | 12/2006 | Bettner et al. | |

FOREIGN PATENT DOCUMENTS

| | | |
|---|---|---|
| CN | 1947030 A | 4/2007 |
| WO | 2009/042426 A2 | 4/2009 |
| WO | 2009/042426 A3 | 5/2009 |

OTHER PUBLICATIONS

Hardin, K. et al. "Investigation Into the Interference Potential of Spread-Spectrum Clock Generation to Broadband Digital Communications", IEEE Transactions on Electromagnetic Compatibility, vol. 45, No. 1, Feb. 2003, pp. 10-21.
International Search Report and Written Opinion for PCT application No. PCT/US2008/076347, Mailed on Mar. 26, 2009, 11 Pages.
U.S. Appl. No. 11/169,365, filed Jun. 28, 2005.
U.S. Appl. No. 11/537,635, filed Sep. 30, 2006.
U.S. Appl. No. 11/694,171, filed Mar. 30, 2007.
U.S. Patent Application No.: to be determined; filed Sep. 21, 2007.
Office Action received for United Kingdom Patent Application No. 1004600.1, mailed on Jan. 23, 2012, 3 pages.
Office Action and Search Report received for Taiwan Patent Application No. 97135670, mailed on Oct. 1, 2012, 8 pages of Office Action including 4 pages of English translation.
Office Action received for Chinese Patent Application No. 200880108255.2, mailed on Aug. 8, 2012, 19 pages of Office Action including 12 pages of English Translation.
International Preliminary Report on Patentability received for PCT Patent Application No. PCT/US2008/076347, mailed on Apr. 1, 2010, 6 pages.

* cited by examiner

*Primary Examiner* — Kabir A Timory
(74) *Attorney, Agent, or Firm* — International IP Law Group, P.L.L.C.

(57) ABSTRACT

In some embodiments an adaptive clock controller is to determine clock interference associated with a channel changing pattern for a radio in a computing platform, and to determine an earliest switching time of a clock of the computing platform. A clock generator is to change a frequency of the clock in response to the determined clock interference and in response to the earliest switching time. Other embodiments are described and claimed.

35 Claims, 7 Drawing Sheets

ADAPTIVE RADIO FREQUENCY INTERFERENCE MITIGATION DURING CHANNEL SCANNING OR HOPPING

TECHNICAL FIELD

The inventions generally relate to adaptive radio frequency interference mitigation during channel scanning or hopping.

BACKGROUND

Wireless computing platforms may communicate using one or more wireless communication channels. With today's wireless platforms it is not possible to completely avoid platform radio frequency interference (RFI). Platform components typically include clocks that, during operation, may generate harmonics that overlap with the frequency range of at least one wireless channel. In some platforms, the close proximity of the clocks and wireless transceivers may introduce significant RFI with one or more wireless channels. The effect of the RFI may be to significantly reduce the bandwidth and/or operating range of the wireless channel.

If a system clock's fundamental frequencies are adjusted such that one radio channel is free of interfering harmonics, another radio channel may be severely degraded.

BRIEF DESCRIPTION OF THE DRAWINGS

The inventions will be understood more fully from the detailed description given below and from the accompanying drawings of some embodiments of the inventions which, however, should not be taken to limit the inventions to the specific embodiments described, but are for explanation and understanding only.

DETAILED DESCRIPTION

Some embodiments of the inventions relate to adaptive radio frequency interference mitigation during channel scanning or hopping.

As mobile computers become thinner and thinner, for example, and more and more radios are added to the system (for example, wireless LAN, Blue Tooth, 3G, WiMAX, etc.) more and more interference may occur between the radios and system clocks of the computing platform. This is particularly true, for example, between a radio antenna on a lid of the laptop and an LCD controller for the display on the lid that are in close proximity to each other.

Some display panels may generate pixel clock sub-harmonics (for example, displays in a mobile computing platform). A reduction of radio frequency interference (RFI) can be used in some embodiments to result in greater wireless network range or greater wireless network throughput, for example. In such a manner, according to some embodiments, streaming video will look better, voice over internet protocol (VoIP) will sound clearer, and downloads will happen faster, for example.

Figure 1A:
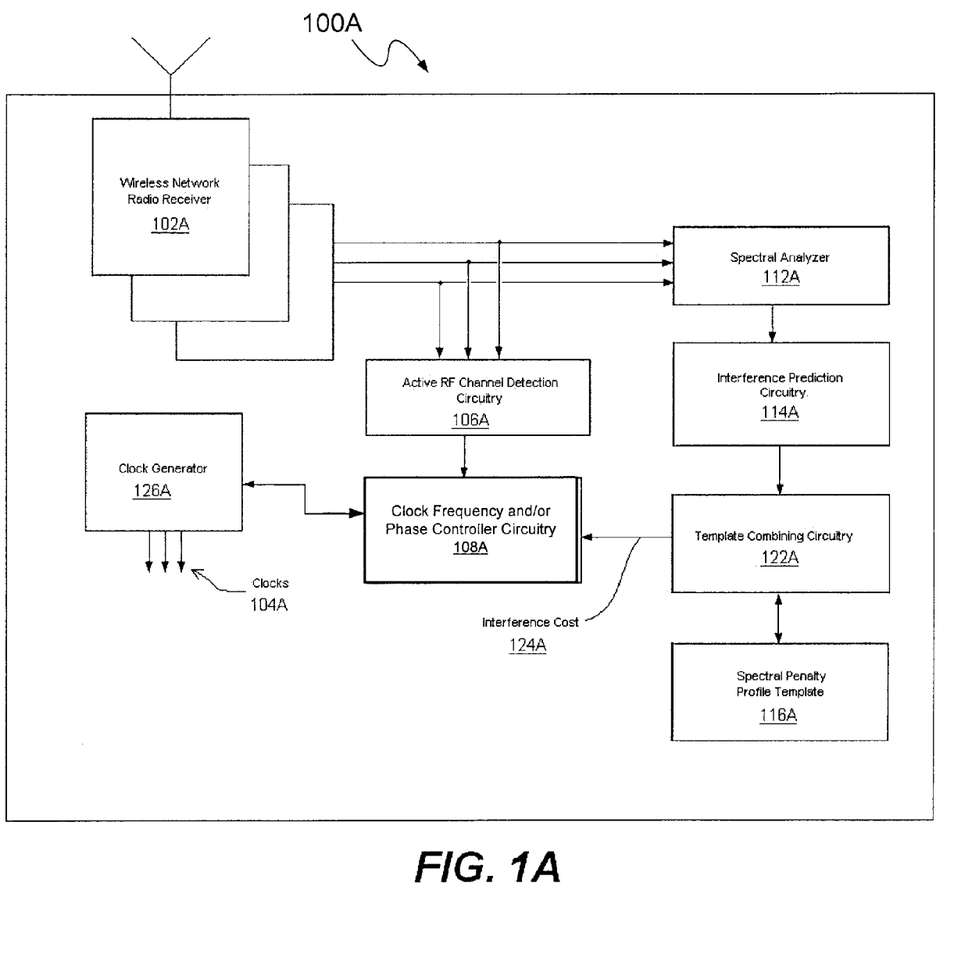
FIG. 1A illustrates a system that may be used in implementing some embodiments of the inventions.

FIG. 1A provides a block diagram of a wireless system 100A consistent with the present disclosure. The wireless system 100A may include a wireless platform, for example, a laptop computer, Palm® computer, Treo® handheld computer, cell phone, global positioning system (GPS), etc. Wireless system 100A may include at least one wireless network radio receiver 102A and at least one clock 104A, generated by clock generator 126A. The at least one wireless network radio receiver 102A may be configured for wireless communication using, for example 802.11a/b/g, BlueTooth, UWB, WiMax, and/or other wireless communication protocols. Each of these communication protocols may operate over a designated RF band (frequency range) and each RF band may include one or more possible active channels within the RF band. Accordingly, each wireless communication receiver 102A may be configured to receive at least one RF channel within at least one RF band.

Clocks 104A may include any system or sub-system clock, which may include, for example, CPU clock, memory clock, display clock, bus clock, and/or other system or subsystem clock etc. Thus, the term "clock" as used herein is intended to broadly cover any clock and/or strobe (for example bus strobe) associated with system 100A.

The wireless system 100A may also include active radio frequency (RF) channel detection circuitry 106A, clock frequency and/or clock spread controller circuitry 108A, spectral analyzer circuitry 112A, and interference prediction circuitry 114A. In this embodiment, the frequencies, amplitudes, and spectral shapes of interfering clock harmonics are estimated by spectral analysis block 112A. Based on these estimated quantities, the interference prediction block 114A predicts the frequency, amplitudes, and spectral shapes of interfering clock harmonics for one more new fundamental frequencies of the clocks. The predicted interference spectra are weighted by applying spectral penalty templates 116 in the template combiner 122A. The instantaneous interference cost for each potential new clock fundamental frequency and/or spread is calculated by the clock frequency and/or clock spread controller 108A using the weighted, predicted interference spectra.

The system clock frequencies and/or spreads that minimize the total interference cost are calculated using methodology such as that described later herein, and are then chosen as target frequencies and/or spreads and reported to clock generator 126A. The clock generator is instructed to then shift the frequencies and/or modify the spread of system clocks 104A to the new target fundamental frequencies.

The active channel detection circuitry 106A may be configured to detect one or more active RF channels associated with one or more wireless network radio receivers 102A. As will be described in greater detail below, to reduce or eliminate RFI (noise) stemming from the harmonic content of at least one clock 104A, clock frequency and/or spread controller 108A may be configured to adjust the frequency and/or spread of at least one clock 104A based on, for example, the current active channel information. The clock frequency and/or spread controller may have hysteresis or smoothing circuitry to prevent oscillation of the clock fundamental frequency and/or spread over time.

Initially, platform radio frequency interference is received by the radio receiver 102A and converted to digital format, then forwarded to the narrowband spectral analyzer 112A, which extracts the interfering tones in the frequency bands of interest. The spectral template combiner 122A applies a spectral weighting template to the extracted tones which emphasizes tones that will cause the most damage to received signals of interest. The clock controller 108A computes a weighted cost of the interfering tones over the band of interest and determines if system clock fundamental frequency modification will decrease that weighted cost. The clock controller determines the system clock fundamental frequencies that result in minimum predicted cost and modifies the system clock generator 126A to move the system clock fundamental frequencies to the desired spectral position. This procedure may occur continuously as other processes in the system (such as power management, wireless network access, etc.) move system clock fundamental frequencies or receiver frequency bands of interest.

Figure 1B:
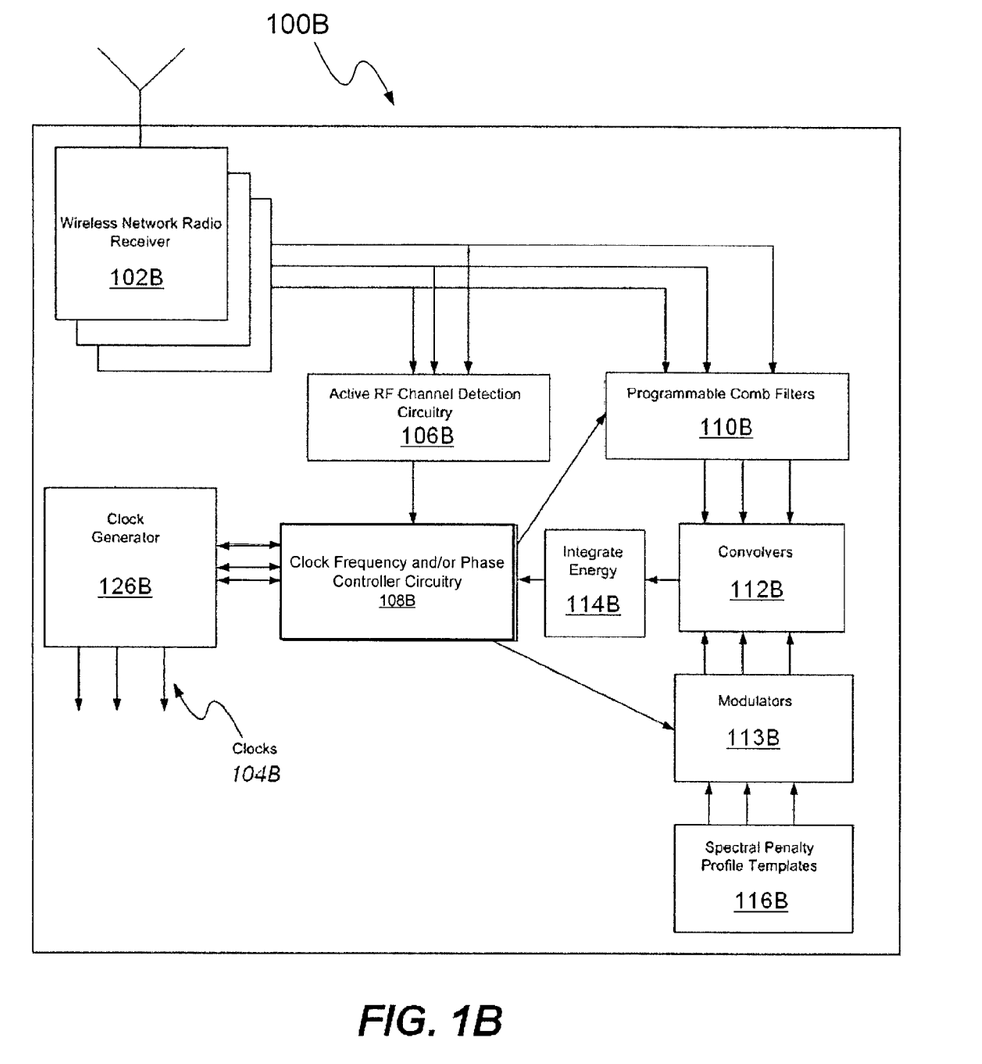
FIG. 1B illustrates a system that may be used in implementing some embodiments of the inventions.

A second wireless system 100B consistent with the present disclosure is shown in FIG. 1B, including an adaptive comb filter 110B. As in the first system, wireless system 100B may also include a wireless platform, for example, a laptop computer, Palm® computer, Treo® handheld computer, cell phone, global positioning system (GPS), etc. Wireless system 100B may include at least one wireless network radio receiver 102B and at least one clock 104B, generated by clock generator 126B. The at least one wireless network radio receiver 102B may be configured for wireless communication using, for example 802.11a/b/g, BlueTooth, UWB, WiMax, and/or other wireless communication protocols.

Similar to the first system, each of these communication protocols of system 100B may operate over a designated RF band (frequency range) and each RF band may include one or more possible active channels within the RF band. Accordingly, each wireless communication receiver 102B may be configured to receive at least one RF channel within at least one RF band. Also as in the first system, clocks 104B may include any system or sub-system clock, which may include, for example, CPU clock, memory clock, display clock, bus clock, and/or other system or subsystem clock etc. Thus, the term "clock" as used herein is intended to broadly cover any clock and/or strobe (for example bus strobe) associated with system 100B.

The wireless system 100B may also include active radio frequency (RF) channel detection circuitry 106B, clock frequency and/or clock spread controller circuitry 108B, convolvers 112B, modulators 113B and integrate energy circuitry 114B. The system clock frequencies and/or spreads that minimize the total interference cost are calculated using methodology such as that described later herein, and are then chosen as target frequencies and/or spreads and reported to clock generator 126B. The clock generator is instructed to then shift the frequencies and/or modify spreads of system clocks 104B to the new target fundamental frequencies.

The clock frequency and/or clock spread controller 108B sets the bandwidth and placement of the teeth of the comb filter to correspond to the expected locations of system clock harmonics. The width of the teeth of the comb filter 110B may vary depending on the expected bandwidth or spread of the system clock harmonics.

The resulting filtered output contains energy primarily at the expected locations of the interfering clock harmonics. If the outputs of the programmable comb filters 110B are spectrally weighted by convolving them with the time-domain spectral templates 116B using convolver 112B, and the energy of the resulting signals is calculated 114B, the result may include an indication of the severity of the interference to the active channels before clocks are shifted. To predict the severity of the interference after a clock shift and/or spread change, the time-domain spectral penalty templates may be modulated and/or comb filter tooth width changed. With properly constructed spectral penalty templates, this is approximately equivalent to shifting the clocks but without the system impact associated with a succession of rapid clock shifts. The modulators 113B shift the spectral penalty templates in increments corresponding to the clock fundamental frequency steps over which the search for optimal shift is taking place. The programmable comb filters 110B modify the comb filter tooth widths in increments corresponding to the clock spreads over which the search for optimal spread is taking place. In this way, the search for optimal clock frequencies and/or spreads is made without ever having to change the clock frequencies. The clock frequency controller circuitry 108B directs the search by providing spacing and tooth widths to the programmable comb filters 110B and by setting the modulation frequency of the modulators 113B. The search may be performed sequentially or simultaneously depending on the desired accuracy and computational resources available. The system clock frequencies that minimize the total predicted interference energy are then chosen as the target frequencies and reported to clock generator 126B. The clock generator is instructed to then shift the frequencies and/or change the spread of system clocks 104B to the new targets.

Figure 1C:
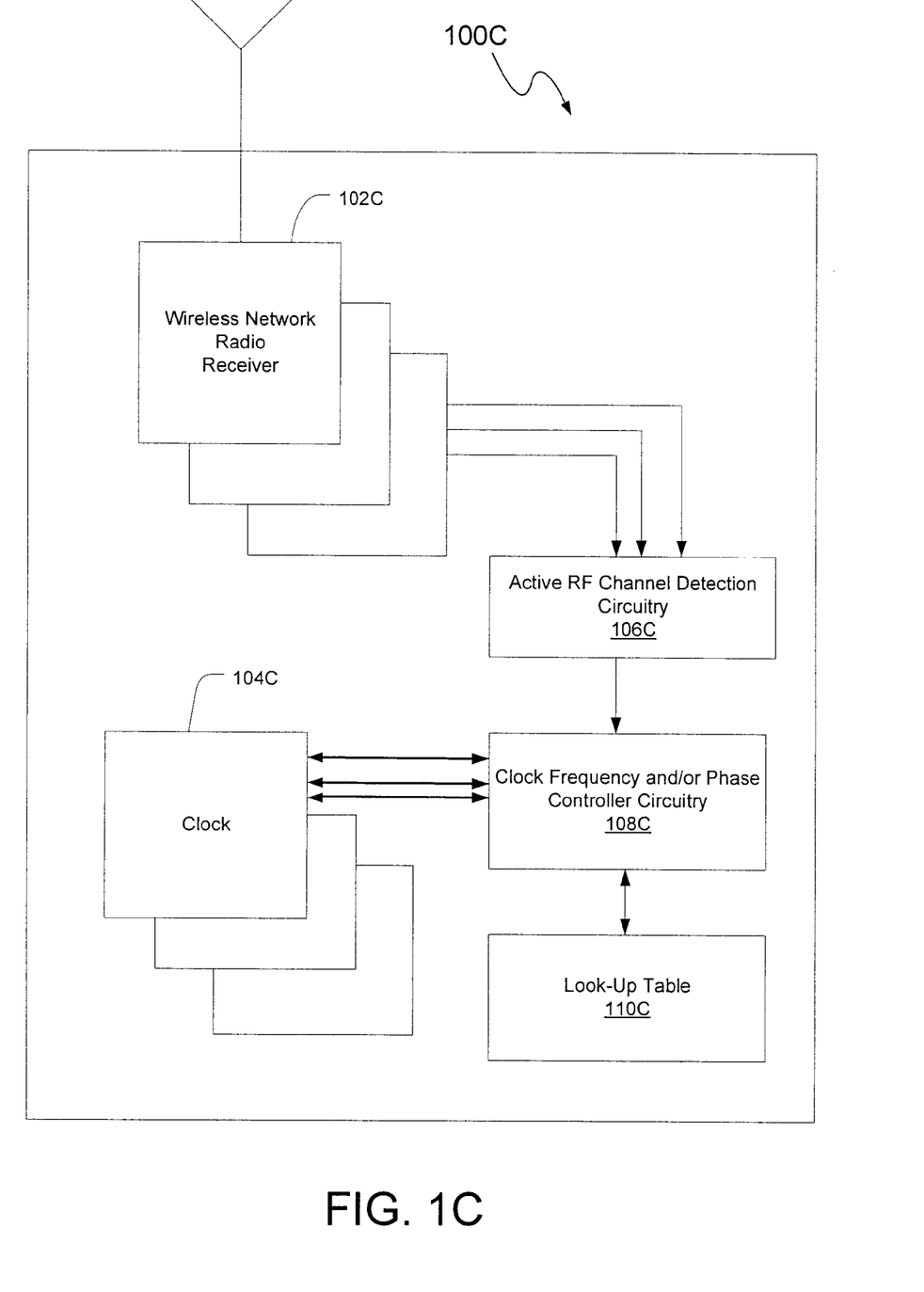
FIG. 1C illustrates a system that may be used in implementing some embodiments of the inventions.

Referring to FIG. 1, consistent with the present disclosure, a wireless system 100C may include a wireless platform, for example, a laptop computer, a Palm® computer, Treo® handheld computer, cell phone, global positioning system (GPS), etc. Wireless system 100C may include at least one wireless network radio receiver 102C and at least one clock 104C. The at least one wireless network radio receiver 104C may be configured for wireless communication using, for example 802.11a/b/g, BlueTooth, UWB, WiMAX, and/or other wireless communication protocols. Each of these communication protocols may operate over a designated RF band (frequency range) and each RF band may include one or more possible active channels within the RF band. Accordingly, each wireless communication receiver 102C may be configured to receive at least one RF channel within at least one RF band. Clock 104C may include any system or sub-system clock, which may include, for example, CPU clock, memory clock, display clock, bus clock, and/or other system or subsystem clock etc. Thus, the term "clock" as used herein is intended to broadly cover any clock and/or strobe (for example bus strobe) associated with system 100C.

The wireless system 100C may also include active radio frequency (RF) channel detection circuitry 106C, clock frequency and/or phase controller circuitry 108C and a look-up table (LUT) 110C. Active channel detection circuitry 106C may be configured to detect one or more active RF channels associated with one or more wireless network radio receivers 102C. The LUT 110C may correlate clock identity information, active channel information and optimal clock frequency. As will be described in greater detail below, to reduce or eliminate RFI (noise) stemming from the harmonic content of at least one clock 104C, clock frequency and/or phase controller 108C may be configured to adjust the frequency and/or phase of at least one clock 104C based on, for example, the current active channel information and the clock identity.

FIGS. 1A, 1B, and 1C have been illustrated herein as including clock generators (for example, clock generators 126A and/or 126B and/or 104C). In some embodiments integrated clock generators may be implemented. In some embodiments a separate component and/or system of components and/or a function of a larger multi-function component may be used to implement clock generation (for example, in some embodiments, using a chipset and/or a microprocessor).

Embodiments have been described above as including elements illustrated in FIGS. 1A, 1B and 1C and in related description thereof. However, according to some embodiments radio frequency interference (RFI) of clock harmonics upon radio antennas of a computing platform (for example, a mobile computing platform) is addressed. According to some embodiments, one or more radio receivers, an adaptive clocking controller, and/or a programmable clock generator may be used. In some embodiments a modified graphics controller may also be used.

Figure 2:
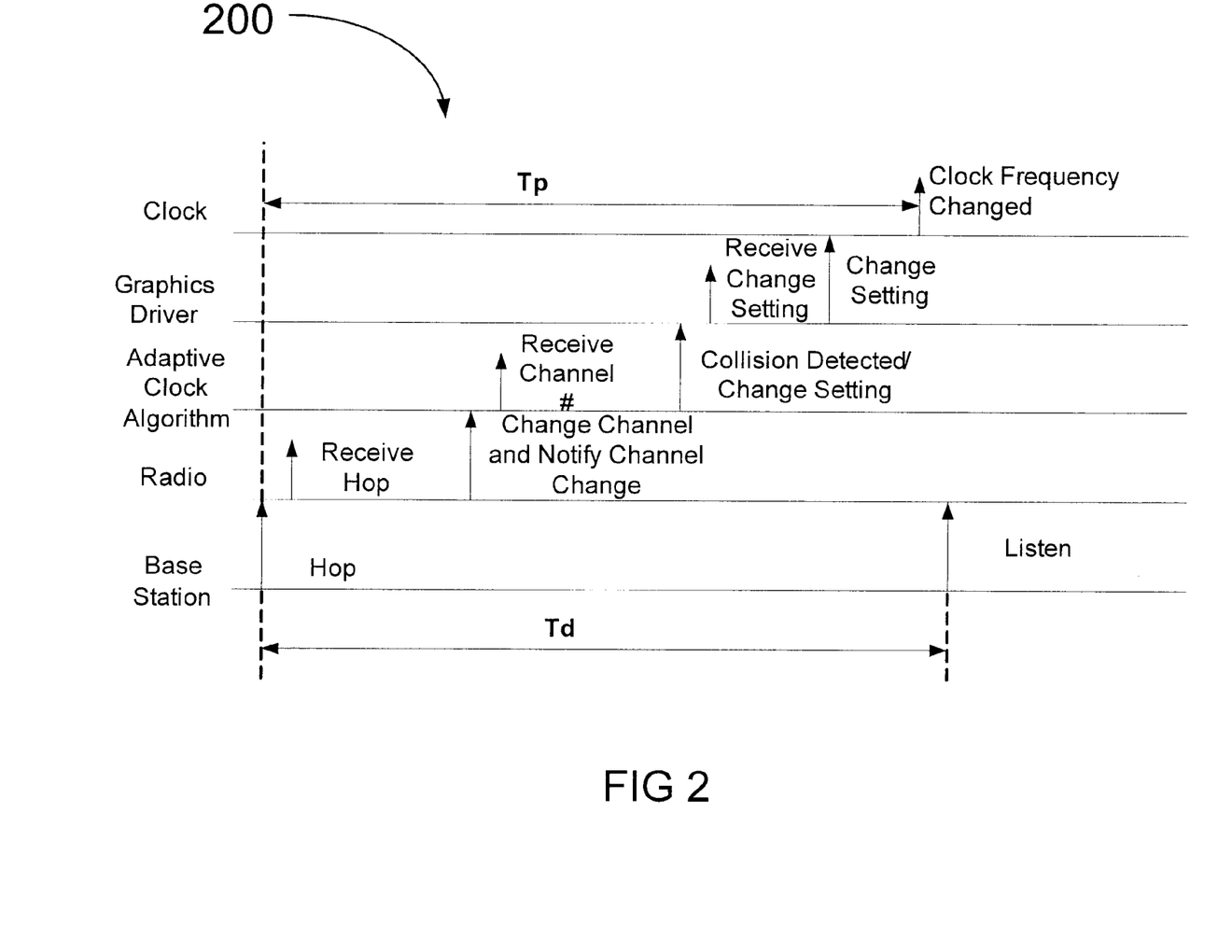
FIG. 2 illustrates a timing diagram to illustrate advantages of some embodiments of the inventions.

FIG. 2 illustrates a timing diagram 200 according to some embodiments. According to some embodiments adaptive clocking is used to provide channel change notification from radios and propagate the notification through, for example, radio firmware, a hardware interface, a device driver, and/or an operating system before reaching an adaptive clock controller (for example, in a system such as the system of FIG. 1A or FIG. 1B). In some embodiments, the clock change decision is propagated through a graphics driver before clock divider registers are written to complete a clock frequency change.

In FIG. 2, timing diagram 200 illustrates timing of events occurring at a base station and at a receiver including, for example, a radio, an adaptive clock controller (or adaptive clock algorithm), a graphics driver, and a clock. A frequency hop occurs first at the base station and the hop is then received at the radio at the receiver. The radio at the receiver then changes the channel and notifies the adaptive clock controller of the channel change. Then the changed channel number is received at the adaptive clock controller. The adaptive clock controller then detects a collision and changes a clock frequency setting. The change clock frequency setting is received at a graphics driver and the setting is then changed. The clock frequency is then changed at a time $T_p$ after the original hop occurred at the base station. The base station expects normal communication with the client radio to commence at least $T_d$ seconds after hopping. If the clock frequency change is not completed within $T_d$ seconds there will be interference in the channel that could potentially disrupt communication between the client radio and the base station. According to some embodiments the intention is to switch the clock frequency as early as possible by knowing the hopping pattern of the frequency hops. That is, the transmitter and the receiver are in sync to each look ahead and provided correct and timely frequency hopping.

In some embodiments such as that illustrated in FIG. 2, if $T_p > T_d$ and there is clock interference in the channel, then the received signal will be degraded for some time before the clock can be moved. If $T_p < T_d$ the interference has been moved in time. If $T_p - T_d$ is greater than the duration of a time slot then the interference cannot be mitigated in time to realize any benefit of adaptive clocking.

Figure 3:
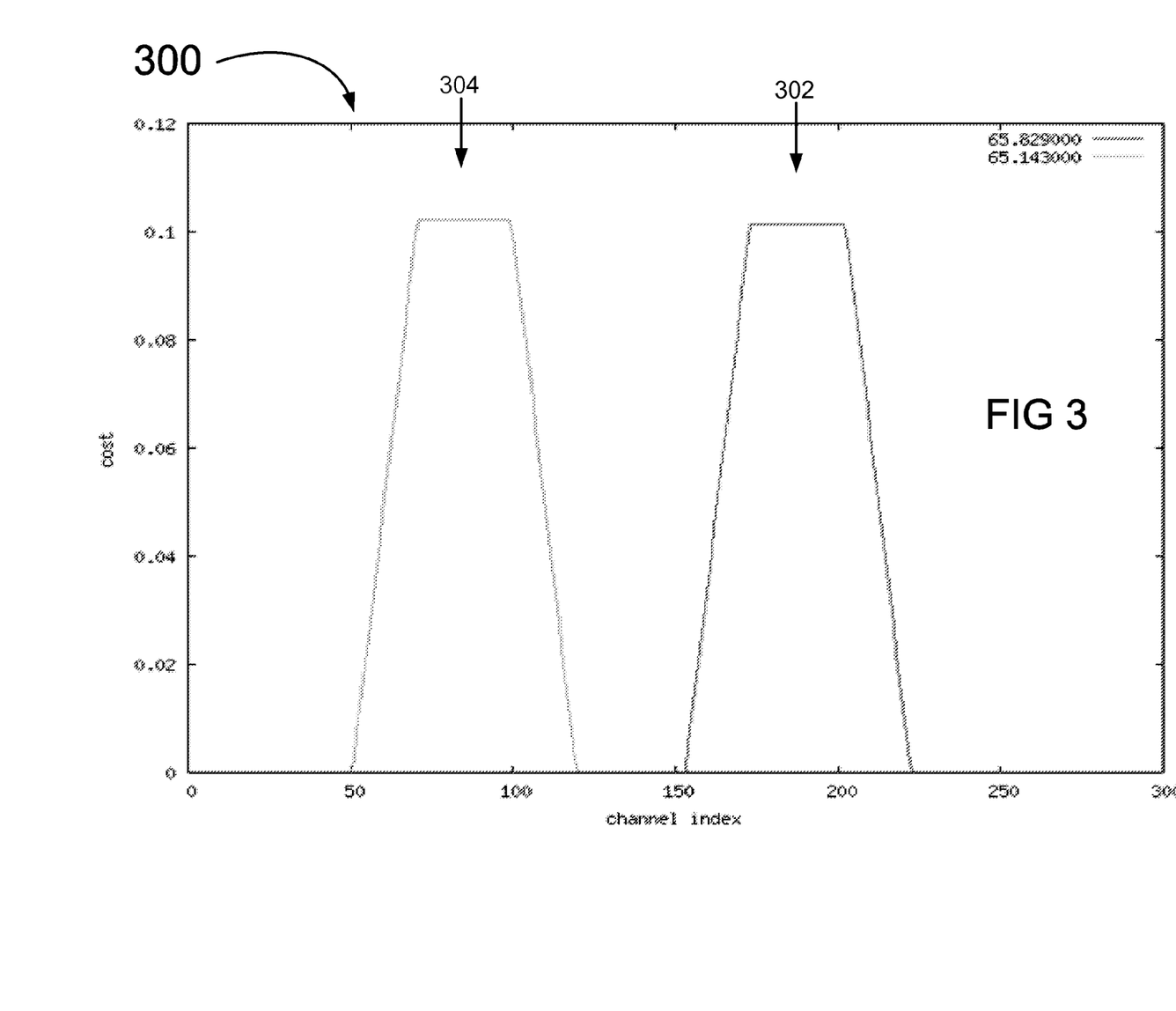
FIG. 3 illustrates a graph according to some embodiments of the inventions.

FIG. 3 illustrates a graph 300 according to some embodiments. In some embodiments graph 300 illustrates a cost vs. a channel index (for example, a permuted channel index). The cost may be thought of as a penalty due to radio frequency interference (for example, between a radio and a display device) and/or as a cost factor from an optimization theory standpoint. The cost patterns illustrated in FIG. 3 can be, for example, cost patterns for WCDMA (wide band code division multiple access) Band II. In some embodiments a cost pattern 302 for a clock frequency of 65.829 MHz is plotted on the same graph as a cost pattern 304 for a clock frequency of 65.143 MHz. For an ascending scan pattern, it is possible to switch clock frequency from 65.829 MHz to 65.143 MHz at time slot 120, which is approximately 35 time slots before such a change becomes necessary in order to avoid interference. Ascending scan is used, for example, during Total Isotropic Sensitivity (T.I.S.) tests needed for carrier certification of 3G radios. Channel switching latency issues such as those that become apparent during ascending scan may be avoided according to some embodiments. Further, according to some embodiments, a dynamic hopping pattern may be used in peer-to-peer wireless communications to minimize the frequency of clock frequency changes.

According to some embodiments, the problem of clock frequency switching latency during radio frequency interference mitigation of clock harmonics upon radio antennas may be addressed (for example, radio antennas of a mobile computing platform). According to some embodiments, a switching prediction algorithm (SPA) may be implemented which includes channel pattern identification, cost pattern generation, minimum switching time estimation, and a switching recommendation. The channel pattern identification block may determine the channel scanning and/or hopping pattern of one or more radio receivers. It may accomplish this by directly receiving the patterns or next channel from the radio receivers themselves, monitoring the radio receivers and predicting the next steps in the pattern, or through a priori knowledge of scanning and/or hopping patterns used for each radio receiver. The cost pattern generation block may predict the total interference cost of one or more system clocks upon one or more radio receivers given the scanning and/or hopping patterns of those receivers. Minimum switching time estimation may be accomplished by comparing the required switching times for all clock frequency candidates and choosing the smallest one. Then a switching recommendation may be made a clock generator or graphics driver.

According to some embodiments, an adaptive clocking subsystem may be used that includes one or more radio receivers (for example, such as radio receivers 102A, 102B and/or 102C), an adaptive clocking controller (for example, such as clock frequency and/or phase controllers 108A, 108B, and/or 108C), and/or a programmable clock generator (for example, such as clock generator 126A, 126B and/or 104C). In some embodiments an optional modified graphics driver may also be included in the adaptive clocking subsystem, for example.

Figure 4:
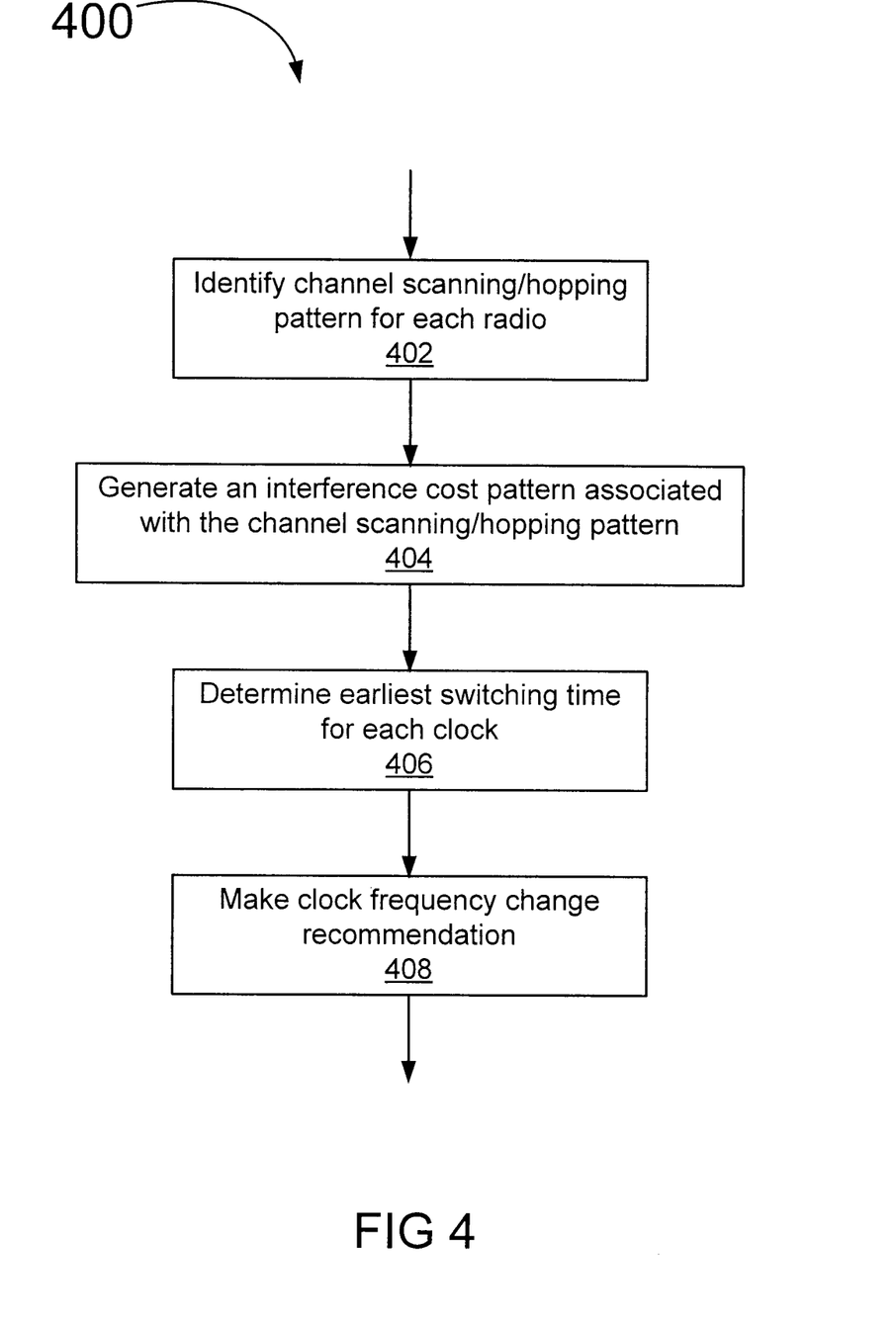
FIG. 4 illustrates a flow according to some embodiments of the inventions.

FIG. 4 illustrates a flow 400 according to some embodiments. At box 402 a channel changing pattern (for example, a channel scanning pattern and/or a channel hopping pattern) is identified for each radio. For example, for a single radio precise change timing is not needed. However, for multiple radios, channel change times are predicted to generate a composite channel scanning and/or hopping pattern. In some embodiments, the pattern and current position within the pattern are communicated (for example, to an SPA) by the radios themselves. In some embodiments, the pattern is detected (for example, by an SPA) using channel change notifications from the radios.

At box 404 the interference cost pattern associated with the channel scanning/hopping pattern is generated. In some embodiments, for each interfering clock, a choice is made (for example, by an adaptive clocking subsystem) from among a discrete set of frequencies to achieve a lowest interference. One pattern per clock frequency for each clock must be generated (for example, using a cost pattern generator of an SPA).

In some embodiments, for each clock, the cost pattern may be generated by evaluating a cost function for the sequence of radio channels in the scanning/hopping pattern. For example, in some embodiments, the cost pattern of the $p^{th}$ clock frequency is:

$$C_1^p, C_2^p, \ldots, C_T^p$$

and the interference cost at time slot t is:

$$C_t = C(\omega_0, \omega_{c,1}(t), \omega_{bw,1}(t), \omega_{c,2}(t), \omega_{bw,2}(t), \ldots \omega_{c,M}(t), \omega_{bw,M}(t),)$$

where $C(\cdot)$ may be defined as:

$$C(\omega_0, \omega_{c,1}, \omega_{bw,1}, \ldots, \omega_{c,M}, \omega_{bw,M}) = \int \left[ \sum_{n=1}^{N_p} A_n \delta(n\omega_0 - \omega) \right] \left[ \sum_{m=1}^{M} P_m \left( \frac{\omega_{c,m} - \omega}{\omega_{bw,m}} \right) \right] d\omega$$

and:
$A_n$ is the amplitude of the $n^{th}$ harmonic
$\omega_p$ is the fundamental frequency of the clock
$P_m(x)$ is the interference penalty function for the $m^{th}$ radio
$\omega_{c,m}$ is the center frequency of active channel of the $m^{th}$ radio
$\omega_{bw,m}$ is the bandwidth of the active channel of the $m^{th}$ radio At box 406 the earliest switching time is determined for each clock. For example, in some embodiments this is accomplished according to the following:
i. If p is the index of the current clock frequency and $C_t^p = C_t^q$ for all q then it is possible to switch early so proceed to ii.
ii. For time slots t+1, t+2, ..., T, find the first time slot $t_c$ for which $C_{t_c}^p \neq C_{t_c}^q$ for some q.
iii. If $C_{t_c}^p > C_{t_c}^q$ then it is possible to switch slot $t_c - t$ slots in advance.

At box 408 a clock frequency change recommendation is made (for example, to an adaptive clocking subsystem). In this manner, the flow 400 of FIG. 4 may be used according to some embodiments to address the problem of clock frequency switching latency during radio frequency interference mitigation of clock harmonics upon radio antennas (for example, in a mobile computing platform).

Figure 5:
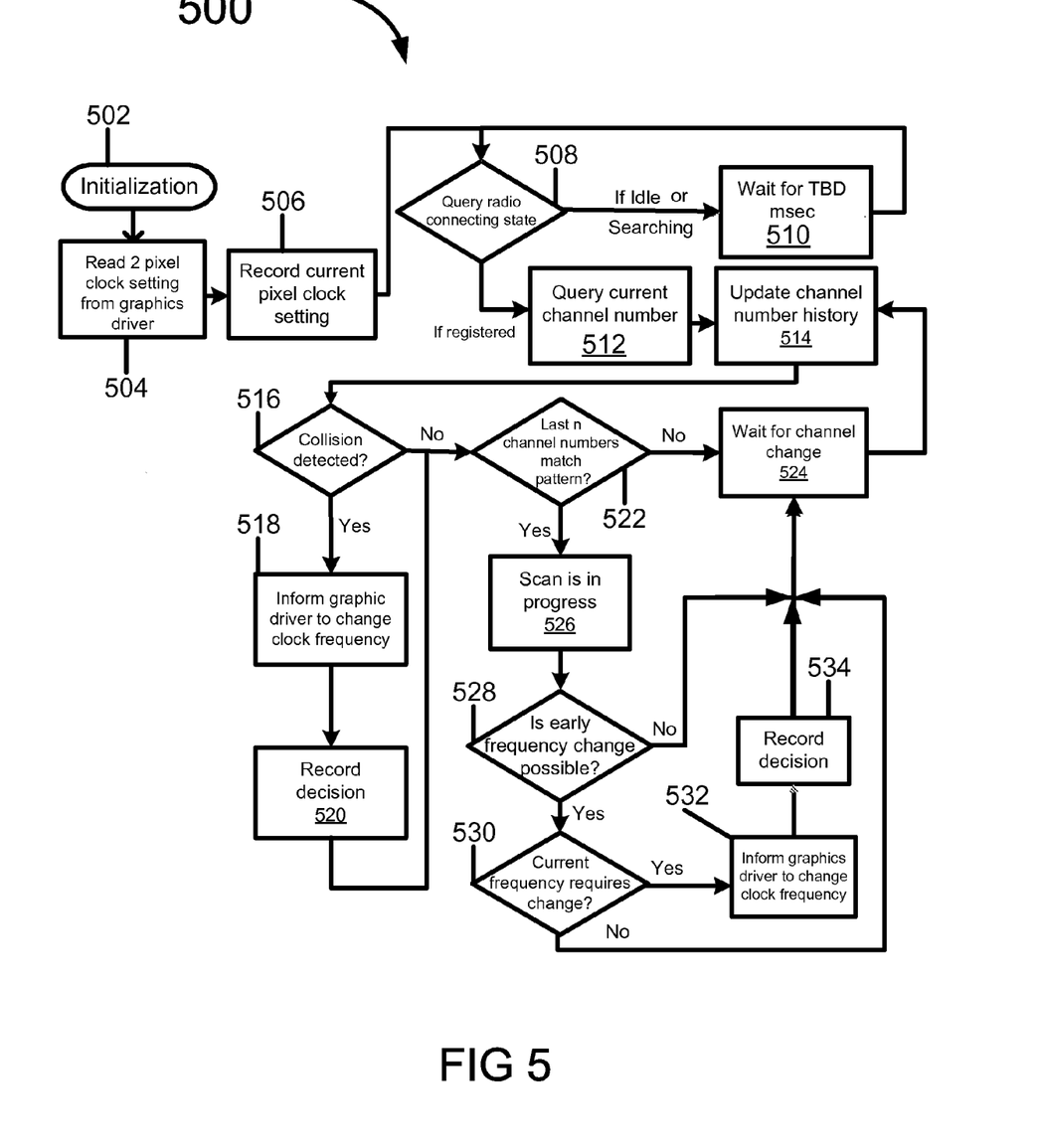
FIG. 5 illustrates a flow according to some embodiments of the inventions.

FIG. 5 illustrates a flow 500 according to some embodiments. At box 502 an initialization process is performed. At box 504 a two pixel clock setting from the graphics driver is read. The current pixel clock setting is recorded at box 506. A determination is made at box 508 as to the radio connecting state. If the radio is idle or searching at box 508, then a wait is performed at box 510 (for example, wait for a predetermined or TBD number of msec), and control then returns to box 508. If the radio is registered at box 508 then a current channel number query is made at box 512. The channel number history is then updated at box 514. At box 516 a determination is made as to whether a collision has been detected (that is a frequency interference collision). If a collision is detected at box 516 then an indication is provided at box 518 to change a clock frequency. In some embodiments, this indication is provided, for example, to a graphics driver. In some embodiments, this indication is provided for example, directly to a clock generator (for example, on the motherboard). In some embodiments, the clock frequency is a clock frequency of any clock (for example, a pixel clock for a display device). The decision to change the clock frequency is recorded at box 520.

If a collision is not detected at box 516 or after a decision to change the clock frequency has been recorded at box 520, then a decision is made at box 522 as to whether the last n channel numbers match a pattern. If the last n channel numbers do not match a pattern at box 522 then the flow 500 waits for a channel change at box 524 and flow returns to update the channel number history at 514. if the last n channel numbers do match a pattern at box 522 then a scan is in progress at box 526. A determination is then made at box 528 as to whether an early frequency change is possible. If an early frequency change is possible at box 528 then a determination is made at box 530 as to whether the current frequency requires a change. If the current frequency does require a change at box 530 then an indication is provided at box 532 to change a clock frequency. In some embodiments, this indication is provided, for example, to a graphics driver. In some embodiments, this indication is provided for example, directly to a clock generator (for example, on the motherboard). In some embodiments, the clock frequency is a clock frequency of any clock (for example, a pixel clock for a display device). The decision to change the clock frequency is recorded at box 534. Once the decision to change the clock frequency is recorded at box 534 flow moves to box 524 to wait for a channel change. If the early frequency change is not possible at box 528 or if the current frequency does not require a change at box 530 then flow also moves to box 524 to wait for a channel change. In this manner, the flow 500 of FIG. 5 may be used according to some embodiments to address the problem of clock frequency switching latency during radio frequency interference mitigation of clock harmonics upon radio antennas (for example, in a mobile computing platform).

According to some embodiments clock frequency switching latency during radio frequency interference (RFI) mitigation of clock harmonics upon radio antennas (for example, of a mobile computing platform) may be addressed using, for example, software, software on the host, hardware, hardware in a chip set, a microcontroller (for example, a microcontroller in a Memory Controller Hub of a chip set), and/or a microcontroller with active management technology, etc.

According to some embodiments, RFI may be reduced during radio channel scanning and/or radio channel hopping. In some embodiments reduced RFI results in greater wireless network range and/or greater wireless network throughput. In some embodiments streaming video will look better, voice over internet protocol (VoIP) will sound clearer, and/or downloads will happen faster. In some embodiments, RFI may be reduced in a mobile computing platform (for example, a laptop computer, a personal digital assistant, a smart phone, etc.)

In some embodiments when a channel scan pattern is produced on radios included in a computing platform clock harmonics may be changed to move out of the way in advance of channel scan progression.

In operation, and referring again to the system 100A, 100B, and/or 100C of FIGS. 1A, 1B, and/or 1C, active RF channel detection circuitry may be configured to detect one or a plurality of active channels. Clock frequency and/or phase controller circuitry may be configured to receive the current active channel information (from RF channel detection circuitry, for example) and to read the interference cost to determine the optimal clock frequency for a given clock for a given one or a plurality of active channels. Based on the information provided by active RF channel detection circuitry and the template combiner, clock frequency and/or phase controller circuitry may be configured to set the clock frequency of one or more clocks to reduce or eliminate RFI in a given active RF channel, or a given plurality of active RF channels.

This system has the advantage that when new radios are added to the system, the system clocks may be automatically adjusted for minimum interference. Moreover, when new wireless signaling schemes become available, a clock controller firmware update may be all that is needed to ensure continued optimal performance with the new wireless network standards.

This system helps to ensure that future multi-radio computing platforms perform better in terms of extending radio range, minimizing power required to achieve a given range, increasing throughput at a given range, and increasing the number of wireless platforms that can co-exist in a given spatial location without interfering with one another. Moreover, this system ensures low impact of platform RFI upon radio performance.

Advantageously, the systems, methods and apparatus described herein may offer enhanced RFI mitigation over conventional approaches. Further advantageously, the systems, methods and apparatus described herein may provide a comprehensive RFI-reducing scheme by adaptively managing a plurality of system clocks that may cause RFI with one or more active RF channels. Further, the systems, methods and apparatus described herein may take advantage of clock-adjustment including clock frequency and/or clock spread without requiring expensive add-on circuitry and/or shielding which may increase the size and/or overall cost of some wireless platforms.

For example, as stated, the at least one wireless network radio receiver 102A and/or 102B may be configured for wireless communication using, for example 802.11a//b/g, Bluetooth, UWB, WiFi, WiMAX, and/or other wireless communication protocols. If an 802.11a/b/g wireless communications protocol is used by one or more wireless network receivers 102, it may comply or be compatible with the protocol described in "ANSI/IEEE 802.11, 1999 Edition", as published by LAN MAN Standards Committee of the IEEE Computer Society (Reaffirmed 12 Jun. 2003). If a Bluetooth wireless communications protocol is used by one or more wireless network receivers 102, it may comply or be compatible with the protocol described in the "802.15.1™ IEEE Standard For Information Technology—Telecommunications and Information Exchange Between Systems—Local and Metropolitan Area Networks," Part 15.1, Version 1.1, published Jun. 14, 2005 by the IEEE Computer Society. If a UWB (Ultra Wideband) wireless communications protocol is used by one or more wireless network receivers 102, it may comply or be compatible with the protocol described in "High Rate Ultra Wideband PHY and MAC Standard," $1^{st}$ Edition, December 2005, published by EMCA International. If a WiMax wireless communications protocol is used by one or more wireless network receivers 102, it may comply or be compatible with the protocol described in "IEEE 802.16-2004", published Oct. 1, 2004 by the IEEE WiMax Committee. Of course, the communications protocol used by one or more wireless network receivers 102 may comply with earlier and/or later versions of these standards.

One or more of the components of the system of FIGS. 1A, 1B, and/or 1C may be embodied in one or more integrated circuits (ICs). "Integrated circuit", as used herein, may mean a semiconductor device and/or microelectronic device, such as, for example, a semiconductor integrated circuit chip. "Circuitry", as used in any embodiment herein, may comprise, for example, singly or in any combination, hardwired circuitry, programmable circuitry, state machine circuitry, and/or firmware that stores instructions executed by programmable circuitry.

In some embodiments an adaptive clock controller is to determine clock interference associated with a channel changing pattern for a radio in a computing platform, and to determine an earliest switching time of a clock of the computing platform. A clock generator is to change a frequency of the clock in response to the determined clock interference and in response to the earliest switching time.

In some embodiments a clock interference associated with a channel changing pattern for a radio in a computing platform is determined, an earliest switching time of a clock of the computing platform is determined, and a frequency of the clock is changed in response to the determined clock interference and in response to the earliest switching time.

In some embodiments a computing platform includes a clock and an adaptive clock controller to determine clock interference associated with a channel changing pattern for a radio in a computing platform, and to determine an earliest switching time of the clock. The computing platform also includes a clock generator to change a frequency of the clock in response to the determined clock interference and in response to the earliest switching time.

In some embodiments an article includes a computer readable medium having instructions thereon which when executed cause a computer to determine clock interference associated with a channel changing pattern for a radio in a computing platform, to determine an earliest switching time of a clock of the computing platform, and to change a frequency of the clock in response to the determined clock interference and in response to the earliest switching time.

Embodiments of the present disclosure may be implemented in a computer program that may be stored on a storage medium having instructions to program a system (e.g., computer system and/or a machine and/or processor) to perform the methods. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

Although some embodiments have been described herein, according to some embodiments these particular implementations may not be required, and/or certain elements may not be required in all embodiments. For example, while some embodiments have been described herein as applying to WCDMA, it is noted that some embodiments apply to other and/or all communications standards and are not limited to WCDMA.

Some embodiments have been described herein as including clock generators and/or clock generation. In some embodiments integrated clock generators may be implemented. In some embodiments a separate component and/or system of components and/or a function of a larger multi-function component may be used to implement clock generation (for example, in some embodiments, using a chipset and/or a microprocessor).

Although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, the interfaces that transmit and/or receive signals, etc.), and others.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. An apparatus comprising:
an adaptive clock controller to determine clock interference associated with a channel changing pattern for a radio in a computing platform, and to determine an earliest switching time of a clock of the computing platform, wherein the adaptive clock controller is to determine clock interference by generating an interference cost pattern, where the interference cost pattern is generated by generating one pattern per clock frequency for the clock; and
a clock generator to change a frequency of the clock in response to the determined clock interference and in response to the earliest switching time.

2. The apparatus of claim 1, wherein the channel changing pattern is a channel scanning pattern.

3. The apparatus of claim 1, wherein the channel changing pattern is a channel hopping pattern.

4. The apparatus of claim 1, the adaptive clock controller further to identify the channel changing pattern.

5. The apparatus of claim 1, further comprising a radio to provide channel pattern and a current position in the pattern to the adaptive clock controller.

6. The apparatus of claim 1, further comprising a radio to provide a channel change notification to the adaptive clock controller.

7. The apparatus of claim 1, wherein the adaptive clock controller is to generate the interference cost pattern by choosing from among a set of frequencies to achieve a lowest interference.

8. The apparatus of claim 1, wherein the adaptive clock controller is to generate the interference cost pattern such that the cost pattern of the $p^{th}$ clock frequency is:

$$C_1^p, C_2^p, \ldots, C_T^p$$

wherein the interference cost at time slot t is:

$$C_t = C(\omega_0, \omega_{c,1}(t), \omega_{bw,1}(t), \omega_{c,2}(t), \omega_{bw,2}(t), \ldots \omega_{c,M}(t), \omega_{bw,M}(t),)$$

where $C(\cdot)$ is defined as:

$$C(\omega_0, \omega_{c,1}, \omega_{bw,1}, \ldots, \omega_{c,M}, \omega_{bw,M}) = \int \left[\sum_{n=1}^{N_p} A_n \delta(n\omega_0 - \omega)\right] \left[\sum_{m=1}^{M} P_m\left(\frac{\omega_{c,m} - \omega}{\omega_{bw,m}}\right)\right] d\omega$$

and wherein:
$A_n$ is the amplitude of the $n^{th}$ harmonic
$\omega_p$ is the fundamental frequency of the clock
$P_m(x)$ is the interference penalty function for the $m^{th}$ radio
$\omega_{c,m}$ is the center frequency of active channel of the $m^{th}$ radio $\omega_{bw,m}$ is the bandwidth of the active channel of the $m^{th}$ radio.

9. The apparatus of claim 1, wherein the adaptive clock controller is to determine the earliest switching time as follows:

If $C_t^p = C_t^q$ for all q, where p is the index of the current clock frequency, then for time slots t+1, t+2, . . . , . . . T, determine the first time slot $t_c$ for which $C_{t_c}^p \neq C_{t_c}^q$ for some q; and If $C_{t_c}^p > C_{t_c}^q$ then switch slot $t_c$–t slots in advance.

10. The apparatus of claim 1, wherein the adaptive clock controller is to determine clock interference by generating an interference cost pattern, such that the cost pattern of the clock frequency is determined in response to an amplitude of a harmonic, a fundamental frequency of the clock, an interference penalty of a radio, a center frequency of an active channel of the radio, and a bandwidth of the active channel of the radio.

11. A method comprising:

determining clock interference associated with a channel changing pattern for a radio in a computing platform, wherein the clock interference is determined by generating an interference cost pattern, where the interference cost pattern is generated by generating one pattern per clock frequency for the clock;

determining an earliest switching time of a clock of the computing platform; and changing a frequency of the clock in response to the determined clock interference and in response to the earliest switching time.

12. The method of claim 11, wherein the channel changing pattern is a channel scanning pattern.

13. The method of claim 11, wherein the channel changing pattern is a channel hopping pattern.

14. The method of claim 11, further comprising identifying the channel changing pattern.

15. The method of claim 14, wherein the identifying includes receiving a channel pattern and a current position in the pattern from the radio.

16. The method of claim 14, wherein the identifying includes receiving a channel change notification from the radio.

17. The method of claim 11, wherein the determining includes choosing from among a set of frequencies to achieve a lowest interference.

18. The method of claim 11, wherein the interference cost pattern is generated such that the cost pattern of the $p^{th}$ clock frequency is:

$$C_1^p, C_2^p, \ldots, C_T^p,$$

wherein the interference cost at time slot t is:

$$C_t = C(\omega_0, \omega_{c,1}(t), \omega_{bw,1}(t), \omega_{c,2}(t), \omega_{bw,2}(t), \ldots \omega_{c,M}(t), \omega_{bw,M}(t),)$$

where $C(\cdot)$ is defined as:

$$C(\omega_0, \omega_{c,1}, \omega_{bw,1}, \ldots, \omega_{c,M}, \omega_{bw,M}) = \int \left[\sum_{n=1}^{N_p} A_n \delta(n\omega_0 - \omega)\right] \left[\sum_{m=1}^{M} P_m\left(\frac{\omega_{c,m} - \omega}{\omega_{bw,m}}\right)\right] d\omega$$

and wherein:

$A_n$ is the amplitude of the $n^{th}$ harmonic $\omega_p$ is the fundamental frequency of the clock $P_m(x)$ is the interference penalty function for the $m^{th}$ radio $\omega_{c,m}$ is the center frequency of active channel of the $m^{th}$ radio $\omega_{bw,m}$ is the bandwidth of the active channel of the $m^{th}$ radio.

19. The method of claim 11, wherein the determining includes:

If $C_t^p = C_t^q$ for all q, where p is the index of the current clock frequency, then for time slots t+1, t+2, . . . , . . . T, determine the first time slot $t_c$ for which $C_{t_c}^p \neq C_{t_c}^q$ for some q; and If $C_{t_c}^p > C_{t_c}^q$ then switch slot $t_c$–t slots in advance.

20. The method of claim 11, wherein the clock interference is determined by generating an interference cost pattern, such that the cost pattern of the clock frequency is determined in response to an amplitude of a harmonic, a fundamental frequency of the clock, an interference penalty of a radio, a center frequency of an active channel of the radio, and a bandwidth of the active channel of the radio.

21. A computing platform comprising:

a clock;

an adaptive clock controller to determine clock interference associated with a channel changing pattern for a radio in a computing platform, and to determine an earliest switching time of the clock, wherein the adaptive clock controller is to determine clock interference by generating an interference cost pattern, where the interference cost pattern is generated by generating one pattern per clock frequency for the clock; and a clock generator to change a frequency of the clock in response to the determined clock interference and in response to the earliest switching time.

22. The computing platform of claim 21, wherein the channel changing pattern is a channel scanning pattern.

23. The computing platform of claim 21, wherein the channel changing pattern is a channel hopping pattern.

24. The computing platform of claim 21, the adaptive clock controller further to identify the channel changing pattern.

25. The computing platform of claim 21, further comprising a radio to provide a channel pattern and a current position in the pattern to the adaptive clock controller.

26. The computing platform of claim 21, further comprising a radio to provide a channel change notification to the adaptive clock controller.

27. The computing platform of claim 21, wherein the adaptive clock controller is to generate the interference cost pattern by choosing from among a set of frequencies to achieve a lowest interference.

28. The computing platform of claim 21, wherein the adaptive clock controller is to generate the interference cost pattern such that the cost pattern of the $p^{th}$ frequency is:

$$C_1^p, C_2^p, \ldots, C_T^p$$

wherein the interference cost at time slot t is:

$$C_t = C(\omega_0, \omega_{c,1}(t), \omega_{bw,1}(t), \omega_{c,2}(t), \omega_{bw,2}(t), \ldots \omega_{c,M}(t), \omega_{bw,M}(t),)$$

where $C(\cdot)$ is defined as:

$$C(\omega_0, \omega_{c,1}, \omega_{bw,1}, \ldots, \omega_{c,M}, \omega_{bw,M}) = \int \left[\sum_{n=1}^{N_p} A_n \delta(n\omega_0 - \omega)\right] \left[\sum_{m=1}^{M} P_m\left(\frac{\omega_{c,m} - \omega}{\omega_{bw,m}}\right)\right] d\omega$$

and wherein:

$A_n$ is the amplitude of the $n^{th}$ harmonic $\omega_p$ is the fundamental frequency of the clock $P_m(x)$ is the interference penalty function for the $m^{th}$ radio $\omega_{c,m}$ is the center frequency of active channel of the $m^{th}$ radio $\omega_{bw,m}$ is the bandwidth of the active channel of the $m^{th}$ radio.

29. The computing platform of claim 21, wherein the adaptive clock controller is to determine the earliest switching time as follows:

If $C_t^p = C_t^q$ for all q, where p is the index of the current clock frequency, then for time slots t+1, t+2, . . . , . . . T, determine the first time slot $t_c$, for which $C_{t_c}^p \neq C_{t_c}^q$ for some q; and If $C_{t_c}^p > C_{t_c}^q$, then switch slot $t_c$-t slots in advance.

30. The computing platform of claim 21, wherein the adaptive clock controller is to determine clock interference by generating an interference cost pattern, such that the cost pattern of the clock frequency is determined in response to an amplitude of a harmonic, a fundamental frequency of the clock, an interference penalty of a radio, a center frequency of an active channel of the radio, and a bandwidth of the active channel of the radio.

31. An article comprising:

a non-transitory, computer readable medium having instructions thereon which when executed cause a computer to:

determine clock interference associated with a channel changing pattern for a radio in a computing platform, wherein the clock interference is determined by generating an interference cost pattern, where the interference cost pattern is generated by generating one pattern per clock frequency for the clock;

determine an earliest switching time of a clock of the computing platform; and change a frequency of the clock in response to the determined clock interference and in response to the earliest switching time.

32. The article of claim 31, wherein the instructions when executed further cause the computer to choose from among a set of frequencies to achieve a lowest interference to generate the interference cost pattern.

33. The article of claim 31, wherein the interference cost pattern is generated such that the cost pattern of the $p^{th}$ clock frequency is:

$$C_1^p, C_2^p, \ldots, C_T^p$$

wherein the interference cost at time slot t is:

$$C_t = C(\omega_0, \omega_{c,1}(t), \omega_{bw,1}(t), \omega_{c,2}(t), \omega_{bw,2}(t), \ldots \omega_{c,M}(t), \omega_{bw,M}(t),)$$

where $C(\cdot)$ is defined as:

$$C(\omega_0, \omega_{c,1}, \omega_{bw,1}, \ldots, \omega_{c,M}, \omega_{bw,M}) = \int \left[ \sum_{n=1}^{N_p} A_n \delta(n\omega_0 - \omega) \right] \left[ \sum_{m=1}^{M} P_m\left(\frac{\omega_{c,m} - \omega}{\omega_{bw,m}}\right) \right] d\omega$$

and wherein:

$A_n$ is the amplitude of the $n^{th}$ harmonic $\omega_p$ is the fundamental frequency of the clock $P_m(x)$ is the interference penalty function for the $m^{th}$ radio $\omega_{c,m}$ is the center frequency of active channel of the $m^{th}$ radio $\omega_{bw,m}$ is the bandwidth of the active channel of the $m^{th}$ radio.

34. The article of claim 31, wherein the instructions when executed further cause the computer to determine the earliest switching time by:

If $C_t^p = C_t^q$ for all q, where p is the index of the current clock frequency, then for time slots t+1, t+2, . . . , . . . T, determine the first time slot $t_c$ for which $C_{t_c}^p \neq C_{t_c}^q$ for some q; and If $C_{t_c}^p > C_{t_c}^q$ then switch slot $t_c$-t slots in advance.

35. The article of claim 31, the computer readable medium further having instructions thereon which when executed cause a computer to determine the clock interference by generating an interference cost pattern, such that the cost pattern of the clock frequency is determined in response to an amplitude of a harmonic, a fundamental frequency of the clock, an interference penalty of a radio, a center frequency of an active channel of the radio, and a bandwidth of the active channel of the radio.

* * * * *